(12) United States Patent
Bobrov

(10) Patent No.: US 7,479,311 B2
(45) Date of Patent: Jan. 20, 2009

(54) OPTICALLY ANISOTROPIC FILM AND METHOD FOR MAKING

(75) Inventor: Yuri A. Bobrov, Zelenograd (RU)

(73) Assignee: Nitto Denko Corporation, Osaka (JP)

( * ) Notice: Subject to any disclaimer, the term of this patent is extended or adjusted under 35 U.S.C. 154(b) by 294 days.

(21) Appl. No.: 10/407,304

(22) Filed: Apr. 3, 2003

(65) Prior Publication Data

US 2004/0197525 A1    Oct. 7, 2004

Related U.S. Application Data

(63) Continuation of application No. PCT/US01/31073, filed on Oct. 3, 2001.

(30) Foreign Application Priority Data

Oct. 5, 2000    (RU) ............................... 2000125053

(51) Int. Cl.
*B32B 3/00* (2006.01)
(52) U.S. Cl. ...................... 428/1.31; 349/100; 359/492
(58) Field of Classification Search ............... 428/1.31; 349/100; 359/97, 492
See application file for complete search history.

(56) References Cited

U.S. PATENT DOCUMENTS 5,528,400 A    6/1996  Arakawa
5,596,434 A *  1/1997  Walba et al. ................. 349/123
5,718,838 A    2/1998  Okazaki
5,730,900 A    3/1998  Kawata
5,739,296 A    4/1998  Gvon et al.
6,174,394 B1   1/2001  Gvon et al.
6,673,398 B2 * 1/2004  Schneider et al. ............ 428/1.2
2002/0084447 A1 7/2002 Taguchi et al.

FOREIGN PATENT DOCUMENTS

| EP | 0 644 439 A1 | 3/1995 |
| EP | 0 738 906 A2 | 10/1996 |
| EP | 0 770 889 A2 | 5/1997 |
| EP | 0 834 752 A1 | 4/1998 |
| WO | WO 99/27398 A1 | 6/1999 |
| WO | WO 00/25155 A1 | 5/2000 |

* cited by examiner

*Primary Examiner*—William P Watkins, III
(74) *Attorney, Agent, or Firm*—Westerman, Hattori, Daniels & Adrian, LLP.

(57) ABSTRACT

Anisotropic film could be used for manufacturing devices of various purposes including information liquid crystal displays, illuminating equipment, decorative products, for manufacturing trademarks and service signs, etc. Essence of the invention: optically anisotropic film is obtained of molecularly oriented organic having varying direction of optical axis (axes) throughout its thickness on at least a fraction of the film's thickness, for at least one region of the spectrum and on at least a part of the area of the film.

The present invention relates to a method of obtaining of the film.

21 Claims, 2 Drawing Sheets

OPTICALLY ANISOTROPIC FILM AND METHOD FOR MAKING

RELATED APPLICATIONS

This application is a continuation of PCT Application Number PCT/US2001/31073, filed on Oct. 3, 2001, which claims the benefit of priority to RU2000125053 filed Oct. 5, 2000, the disclosures of both of which are incorporated herein by reference in their entirety.

FIELD OF THE INVENTION

The present invention relates generally to manufacturing devices for various purposes including information liquid crystal displays, illuminating equipment, decorative products, and for manufacturing trademarks and service signs and the like.

BACKGROUND OF THE INVENTION

Anisotropic films have been used as polarizers through a varying the direction of the optical axis of the film's material throughout the thickness of the polarizing film as described in Russian Patent RU 2110818, G02B, May 10, 1998). The polarizing layer or film consists of separate elements, the optical axes of which are directed at a certain angle relative to each other. This angle generally varies in the range of about 0 to 90°.

Methods of obtaining optically anisotropic films, which are usable as polarizers, typically involve application of an organic dye solution in a lyotropic liquid crystal (LLC) state, with subsequent removal of the solvent, as disclosed in Russian Patent RU 2110818. In the process of application of the dye solution, an orienting influence is imposed, which is directed along the surface of the substrate at different angles to one of its sides (the angle varies from 0 to 70°). In this polarizer, the variation of the polarizing axis through the film thickness is not taken into account, which narrows the area of its application. To achieve an approximate direction of the optical axis throughout the thickness of the polarizer with traditional methods is possible only by sequential application of several anisotropically absorbing layers with various orientations of the optical axes. Such a process is technologically difficult. Additionally, during application of every new layer, the previous layer may develop defects in the ordered molecular structure, which leads to lowering of the polarizing effectiveness and uniformity of properties over the entire area of the polarizer. As a result of this, an intermediary protective film should separate the layers in order to obtain the necessary degree of orientation, which hinders the process of manufacturing, increases the thickness of the polarizer and further degrades the optical properties of the polarizer.

SUMMARY OF THE INVENTION

The advantages of the present invention may be realized through the optically anisotropic films and methods for making these films described herein as well as through any equivalents of these films and methods for making.

In one embodiment of the present invention, an optically anisotropic film is provided. The film comprises a molecularly oriented organic material, that further comprises at least one organic dye. The organic dye has a structural formula that includes at least one ionogenic group. The at least one ionogenic group provides solubility for the dye in polar solvents. On at least a fraction of the film and on at least a fraction of the surface of the film, at least one optical axis varies throughout the thickness of the film.

In an alternative embodiment of the present invention, a method of obtaining an optically anisotropic film is provided. The method comprises the step of applying a lyotropic liquid crystal on a surface of a substrate. The lyotropic liquid crystal comprises at least one organic material dissolved in a solvent. At least a part of the substrate has a surface anisotropy. The method further comprises the step of applying an external alignment action to the lyotropic liquid crystal. This external alignment action has a direction which does not coincide with a direction defined by the surface anisotropy. The method also comprises the step of removing the solvent.

BRIEF DESCRIPTION OF THE DRAWINGS

Other objects and advantages of the present invention will become apparent upon reading the detailed description of the invention and the appended claims provided below, and upon reference to the drawings, in which:

DETAILED DESCRIPTION OF THE INVENTION

Figure 1:
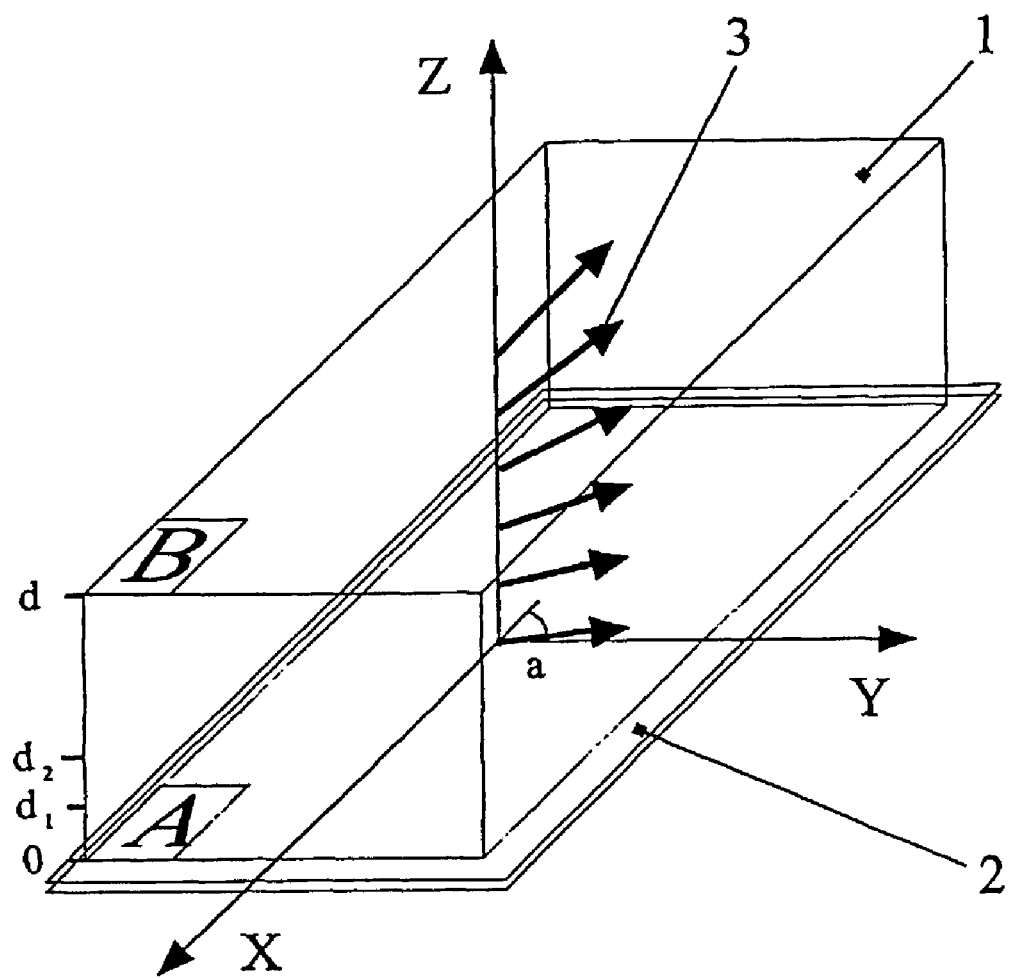
FIG. 1 is a schematic diagram illustrating the composition of an optically anisotropic film with a screw-like structure according to one embodiment of the present invention.

In general, the technical result of the disclosed invention includes the broadening of the functional possibilities of application of optically anisotropic films while simplifying the method of manufacturing. Reproducible optical parameters and high levels of optical anisotropy are further achieved over the entire area and volume of the film. This result may be obtained because the optically anisotropic film of the molecularly ordered organic matter has varying direction of the optical axis (axes) throughout the thickness of the film, in at least a part of the film's thickness, for at least one region of the spectrum and on at least a part of the area of the film.

The technical result may also be achieved by the fact that the film is anisotropically absorbing and/or phase-shifting for at least one region of the spectrum.

Furthermore, the first derivative of the function describing the variation of the optical axis angle throughout the thickness of the film is continuous (smooth). Besides that, the function describing the angle of twist of the optical axis throughout the thickness of the film is not symmetrical around any section plane parallel to its surface.

The film may be obtained from a liquid crystal of at least one organic matter or compound or material, which forms a lyotropic or thermotropic liquid-crystal phase, via application of the liquid crystal onto the substrate with the use of the external orienting influence and drying, while at least a part of the substrate surface possesses surface anisotropy, and the direction of the external alignment influence does not coincide with the direction induced by at least a part of the substrate surface.

The technical result may be further achieved by variation of the optical axis direction throughout the thickness of the film that is provided in the process of its manufacturing via the impact on the LC by the anisotropic surface of the substrate and the external alignment influence. The directions of the mentioned orienting actions do not coincide.

The technical result may also be achieved by that fact that the law of variation of the polarizing axis direction throughout the thickness of the film is determined by the anisotropy of the substrate surface and/or the direction and force of the external alignment influence and/or the thickness of the forming film and/or the viscosity of the employed liquid crystal and/or the conditions of its application and drying.

The technical result may also be achieved by using, in the capacity of the organic matter, which is used for obtaining the liquid crystal, at least one organic dye featuring in its structural formula at least one ionogenic group, which provides its solubility in polar solvents in order to form lyotropic liquid crystal phase, and/or at least one non-ionogenic group, which provides its solubility in polar or non-polar solvents in order to form lyotropic liquid crystal phase, and/or at least one anti-ion, which in the process of formation of the optically anisotropic film either remain in the structure of molecules or not.

The technical result may also be achieved by using, in the capacity of the organic dye, at least one organic dye of the form:

$${K}(M)_n, \qquad (1)$$

where, K—is the dye, chemical formula of which contains ionogenic group or several groups (same or different), which provide its solubility in polar solvents in order to form lyotropic liquid-crystal phase, M—anti-ion, and n—the number of anti-ions in a molecule of the dye, which could be a fraction in the case of sharing of one anti-ion by several molecules and in the case of n>1 anti-ions could be different.

The technical result may also be achieved by the fact that the film is formed by numerous supramolecular complexes of one or several organic matters, and the supramolecular complexes are oriented in a particular direction in order to polarize light.

The technical result may also be achieved by that fact that the film consists of at least two fragments, situated in one plane, axes of polarization of which on the surface of the film (near-surface layer) are directed at an angle relative to each other ranging from 0 to 90°.

The technical result may also be achieved by the fact that on the surface of the film there has been formed or applied at least one optically anisotropic film, and/or at least one phase-shifting film, and/or at least one birefringent film, and/or at least one alignment film, and/or at least one protective film, and/or at least one film simultaneously performing functions of any combination of at least two of the mentioned films.

The technical result may also be achieved by the fact that the film is the polarizing film, and/or the phase-shifting film, and/or alignment layer, and/or protective film, and/or a film simultaneously functioning as any combination of at least two of the mentioned films on at least a part of the polarizers thickness and/or in at least one region of the spectrum and/or on at least one part of the polarizers area.

The technical result may also be achieved by that fact that the substrate is made out of a polymer material or glass, and has flat, or concave, or convex, or varying according to a certain law shape of the surface, and anisotropic properties of the substrate's surface on at least a part of its surface provided by either chemical bonds or by a relief or texture formed on substrate's surface either out of the material of the substrate itself or out of an applied onto the substrate's surface material.

The technical result may also be achieved by the fact that optically anisotropic film is obtained by a method involving application of liquid crystal of at least one organic matter, with removal of the solvent in the process, and/or after formation of the film an alignment influence is imposed onto the liquid crystal and the film is formed on the anisotropic surface of the substrate or alignment layer, while the direction of the alignment influence and the direction of surface orientation of the substrate or the layer situated at an angle ranging from 0 to 90°.

In the disclosed method, the substrate surface and/or alignment layer can consist of at least two regions with different direction of the surface orientation.

In the disclosed method for obtaining surface anisotropy on the surface of the substrate one could form a regular structure or a relief either from the material of the substrate, or from the applied onto the substrate material via mechanical and/or chemical and/or other treatment.

In the disclosed method in order to provide additional variation of polarizing axis direction throughout the thickness of the film in the process of film formation, the direction of the alignment influence over the surface can be varied.

In the disclosed method, one can form regions with various properties, including different direction of the surface orientation, on the surface of the substrate.

A number of organic materials may be used in the manufacture of optically anisotropic films. These materials include, for example, the dyestuffs such as polymethine dyestuffs, for example, "psuedoisocyanine", "pinacyanol;" triarylmethane dyestuffs, including for example, "osnovnoi biriuzovii" (C.I. Basic Dye, 42035 (Turquoise Blue BB (By))) and "kislotnii yarko-goluboi 3" (C.I. Acid Blue 1, 4204); diaminoxanthene dyes, including for example, "sulforhodamine S" (C.I. Acid Red 52, 45100 (Sulforhodamine B)); acridine dyes, including for example, "osnovnoi zholtii" (C.I. Basic Dye, 46025 (Acridine Yellow G and T(L))); sulfonation products of acridine dyes, including for example, "trans-quinacridone" (C.I. Pigment Violet 19, 46500 (trans-Quinacridone)); water-soluble derivatives of anthraquinone dyes, including for example, "aktivnii yarko-goluboi KH" (C.I. Reactiv Blue 4, 61205); sulfonation products of vat dyes, including for example, "flavantrone" (C.I. Vat Yellow 1, 70600 (Flavanthrone)), "indantrenovii zholtii" (C.I. Vat Yellow 28, 69000), "kubovii zholtii 4K" (C.I. Vat Orange 11, 70805), "kubovii tyomno-zelenii Zh" (C.I. Vat Green 3, 69500), "kubovii fioletovii S" (C.I. Vat Violet 13, 68700), indanthrone (C.I. Vat Blue 4, 69800 (Indanthrone)), perylene violet dye (CAS: 55034-81-6), "kubovii alyi 2Z" (C.I. Vat Red 14, 71110); azo-dyes, including for example, Benzopurpurine 4B (C.I. Direct Red 2, 23500), "Pryamoy zheltii svetoprochniy O" and "Pryamoy zheltii svetoprochniy" (C.I. Direct Yellow 28, 19555); water soluble diazine dyes, including for example, C.I. Acid Blue 102, 50320; sulfonation products of dioxazine dyes, including for example, "pigment fioletovii dioxazinovii" (C.I. Pigment Violet 23, 51319); water-soluble thiazine dyes, including for example, C.I. Basic Blue 9, 52015 (Methylene Blue); water-soluble derivatives of phtalocyanine dyes, including for example, cupric octacarboxyphtalocyanine salts; fluorescent bleaches; and also other colorless organic substances, including for example di-sodiumchromoglycate.

An optically anisotropic film is a film of a material possessing anisotropy of optical properties, which in a general case are characterized by the complex refraction coefficient $N_j = n_j - i \ast k_j$, where $n_j$ and $k_j$ are the main components of tensors of the refraction coefficient and absorption coefficient accordingly. The value of the refraction coefficient for the majority of the organic materials varies in the range from 1.3 to 2.5; the absorption coefficient varies in the range of 0 to 1.5. Anisotropy of $n_j$ determines the phase-shifting properties of the film, while anisotropy of $k_j$ determines polarizing properties. Therefore, optically anisotropic film in a general case is simultaneously a phase-shifting and polarizing one. In a particular case, when the absorption coefficient is close to 0 in the visible light spectrum, the film in this spectrum range is only phase-shifting, and it may absorb light (be a polarizer) in the UV range of the spectrum.

Depending on the molecular structure the absorption bands can be in different spectral ranges: UV, visible and IR, or in several spectral ranges. Therefore, a film in one range of spectrum can feature polarizing and phase-shifting properties and only phase-shifting in the other.

By creating the variation of the optical axis direction throughout the thickness, it is possible to change not only the direction of the polarizing axis for a polarizing film, but also the direction of the "fast" and/or "slow" axis for a phase-shifting film. This influences not only the intensity of the passing linearly polarized light depending on the orientation of its polarizing plane, but also the degree of ellipticity (strongly elliptical vs. weakly elliptical) of its polarization and the direction of the axes of this ellipse at the exit from the film. For example, when absorption is small and the following conditions hold: $(n_o-n_e)d > \lambda/4$—where $n_o$ and $n_e$, are the refraction coefficients of the ordinary and extraordinary rays, respectively, and d is the thickness of the film—a screw-like structure will rotate the polarization plane to a predetermined angle if its polarization plane upon incidence on the lamina is parallel or perpendicular to the direction of the fast axis on that plane. The value of birefringence, defined as $\Delta n = n_o - n_e$, ranges from approximately 0.1 to 0.9 for the organic dyes that form lyotropic liquid crystal phases according to the present invention. Therefore, the earlier noted condition is attained at a film thickness in the range of approximately 0.15 to 1.3 μm, which is within the limits of the usually obtained film thickness. Variation of the polarization plane orientation or the presence of absorption of ordinary or extraordinary ray will affect ellipticity of the exiting from the film light. All these effects, in the end, affect the optical properties of the films of the present invention and depend on the degree of optical anisotropy of the film, the direction of propagation of polarized light, the thickness of the film, and the law of the orientation variation.

As shown in FIG. 1, the optically anisotropic film 1 is represented in the system of coordinates XYZ, where the X-axis coincides with the direction of the external alignment influence that is imposed during film formation and the Z-axis is situated along the normal to the film's surface. In the layer of the film 1, adjacent to the substrate 2, the optical axis 3 of the film 1 is directed at a certain angle α to the X-axis and this direction is conserved until a certain thickness $d_1$. This direction is introduced by the oriented surface processing of the substrate 2 or previously applied additional organic layer. The oriented processing may be implemented via rubbing, photo-orientation or one or more other comparable methods. Then, the optical axis may be rotated, in the span $d_1$-$d_2$, to the direction coinciding with the X-axis (direction of the external alignment influence), thus retaining this orientation in the rest of the thickness up to the other surface of the film-d. The rotation of the axis is realized by utilizing the viscous forces during film application with any of the aforementioned methods. During application of the external orienting force, the optical axis retains its orientation parallel to the substrate surface. The thickness $d_1$ of the near-surface and the intermediary layer $d_2$-$d_1$ depends on the rheological properties of the material during its application onto the substrate, the material of the surface layer of the substrate, the method of application and other technological factors. The thickness of layer 0-$d_1$ may have a value from a few percent to tens of percent of the total film thickness.

If the dependence of the variation of the optical axis orientation is not symmetrical relative to the center of the film's thickness, then the optical properties of such lamina also are not symmetrical relative to the direction of light propagation. The light transmission coefficient then depends on the side of the lamina on which the polarized light hits the lamina: i.e. from the side of the substrate or from the side of the film.

Figure 2:
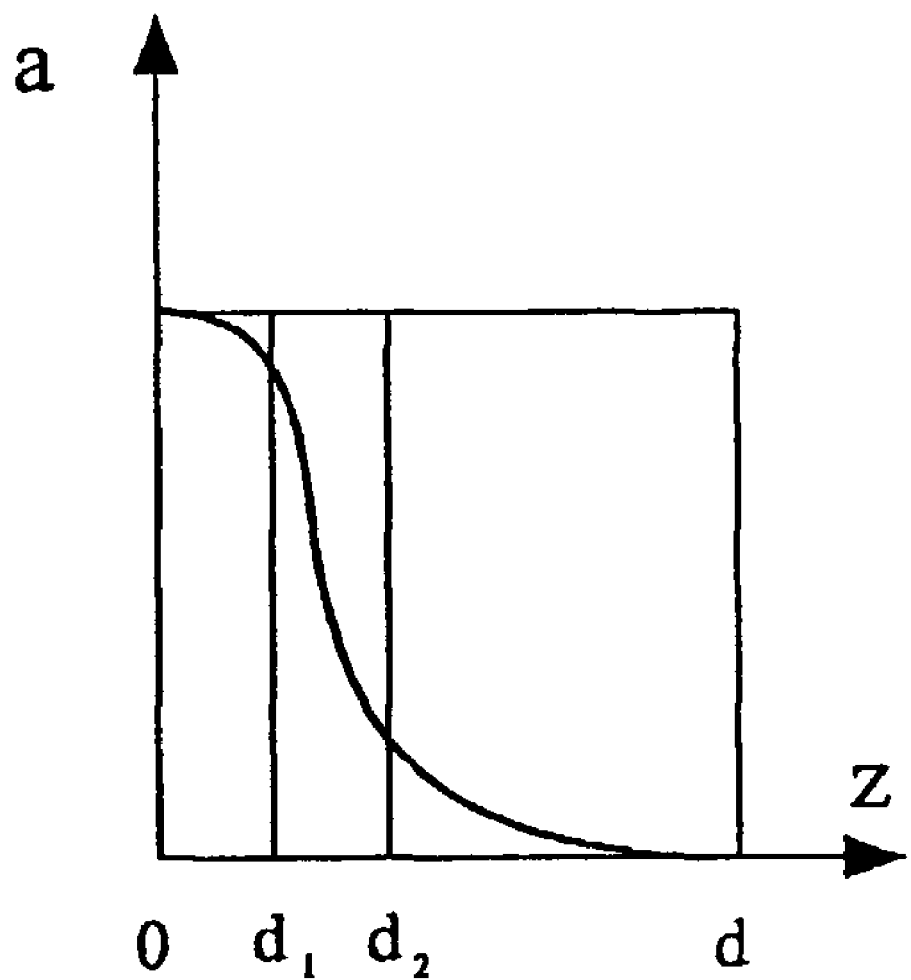
FIG. 2 is a schematic diagram illustrating the dependence of optical axis orientation variation (the angle of twist) throughout the thickness of the film according to one embodiment of the present invention.

As an illustrative example, consider a case where layers 0-$d_1$ and $d_1$-$d_2$ are thin compared to the total thickness of the film ($d_1 d_2 << d$) as shown in FIG. 2. In the case when linearly polarized light is incident on the film 1 from the side B so that the polarization plane of the light is perpendicular to the optical axis of the layer $d_1$-d, the light is absorbed in that layer and with sufficient thickness the intensity of transmitted light could be as little as about 1-2% of the incident. Further travel through the layers 0-$d_1$ and $d_1$-$d_2$ will have little influence on the intensity of the traveling beam because of their small thickness and the intensity of absorption per unit length in the layer 0-$d_1$ and $d_1$-$d_2$ will be smaller than in the layer $d_1$-d because of rotation of the optical axis. The passing of light through layers 0-$d_1$ and $d_1$-$d_2$ makes it elliptically polarized. However, due to the absence of an additional polarizer between the viewer and the lamina, the effect of linear depolarization remains undetected. Therefore, at the exit from the lamina, the intensity is approximately 1-2% of the initial, which is determined mainly by the thickness of the film d. Upon incidence of flatly polarized light with the same orientation but from the side A, part of the film 0-$d_1$ will work as birefringent phase-shifting lamina and at its exit the light will have elliptical polarization, which is further analyzed by the polarizer which in this case is the layer $d_1$-d. The optical transmittance of such a film is equivalent to the transmittance of a birefringent lamina system situated between two cross-oriented polarizers. it's the transmittance of the film depends on the angle α and the thickness $d_1$ as a periodic function, and the maximum transmittance may reach 50%. Existence of the transitional layer $d_1$-$d_2$ in this case does not change the physical situation in principal. Therefore, transmittance of polarized light by the herein declared optically anisotropic lamina depends on which side the light is incident upon the film.

The following detailed embodiments illustrating potential implementations of the present invention are presented for the purpose of illustration. These embodiments are intended for illustration purposes only, and are not intended to limit the scope of the present invention in any way.

As discussed above, a film that anisotropically absorbs light of at least one particular wavelength is formed on a substrate, which may be a single-layer transparent lamina (glass, plastic, etc.) as well as a structure formed with at least two transparent layers. The shape of the substrate may also be varied. The choice of substrate material and shape will be dictated by the purpose of the end product and may be determined by one of skill in the art with reference to the teachings and disclosures provided herein.

According to the present invention, processing of the substrate surface, creates the desired parameters of the surface anisotropy. On the substrate, on at least that part of it where the optically anisotropic film with varying direction of optical axis throughout its thickness will be created, conditions are provided for orienting molecules and/or supramolecular complexes of LC material. Various methods may be employed for this purpose. A few illustrative examples include the method of substrate surface activation, resulting from chemical, ionic or any other processing of the substrate surface, in which an activation of chemical bonds of molecules is produced on the substrate surface, at which time the major alignment directions are created; or the method of creating a directional surface relief, using the material of the substrate itself or an additionally applied material to form oriented relief or textural elements or certain shapes and grooves, etc., on the surface of the substrate. To achieve this, the method of photo lithography may be employed to create smaller elements. Alternatively, the method of mechanical rubbing of the surface with a selected abrasive material may be employed. During mechanical processing it is advised to pay attention to the necessity of removing possibly created particles and cracks on the substrate surface, which could lead to distortions of the desired orientation.

Other methods are also envisioned by the scope of the present invention. Since this example makes use of the properties of liquid crystals to orient in the channel during flowing (application) along the axis of the channel, the necessary degree of orientation of supramolecular complexes on the substrate surface will be determined by the depth and directionality of the substrate surface relief. In other words, a certain degree of surface anisotropy is created on the substrate.

If required, the relief may be created on one or more regions of the substrate, and different regions can have different surface properties. Also, there may be regions which do not promote orientation of the liquid crystal.

In one embodiment, application of the liquid crystal film may be implemented via a method similar to those described in U.S. Pat. No 5,739,296, which are based on rod, slot and roll methods. In these methods, the process of application of the liquid crystal solution layer is combined with the simultaneous orientation of an already present supramolecular complexes under the action of viscous forces, which appear in the process of application during stretching of the liquid layer or shearing of one layer relative to the other. For the purpose of creating spatially varying orientation of the polarization axis over the area of the polarizer, the application tool may change the direction of movement over the substrate surface. The speed of movement and the law of variation of movement direction will determine the orientation of the supramolecular complexes of the liquid crystal.

In order to create the spatially varying orientation of the polarization axis during application of the polarizing films of the present invention with the rotating cylindrical roll, grooves may be formed on the surface of the roll at a predetermined angle, which induces the direction of orientation of the supramolecular complexes, and consequently, the direction of the polarizing axis over the surface. The grooves may be created by reeling a thin wire (preferred diameter 20-150 μm) onto the roll under a certain angle to the axis of the roll, or by methods such as mechanical or chemical engraving. In the case of engraving, the profile of the grooves may be rectangular, rhomb-like, semicircular or other shape. The width of the grooves may be in the range of approximately 50-500 μm, the depth in the range of approximately 10-100 μm, and the width of the wall over the top of the groove in the range of approximately 10-50 μm.

Using a roll with grooves with the given direction of the grooves allows formation of polarizing drawings of various shape with various direction of polarization axis over the surface, and sequential use of several rolls with different dye colors allows creating multi-colored drawings. Moreover, the direction of the optical axis of the forming film on its surface will coincide with the direction induced by the grooves on the roll.

Combination of the above two effects on the liquid crystal (the alignment effect of the substrate and the external alignment influence of the application tool), will determine the law of variation of the optical axis (axes) direction through thickness of the forming film, depending on which effect provides the greater contribution in the alignment of molecular complexes and with the condition of differing directions of action between the two.

Using various liquid crystal solutions of various concentration and viscosity one can obtain films of different thickness, which also will determine the degree of variation of the polarization axis through thickness of the film. With the rest of the manufacturing conditions the same, forming films of various thickness one could obtain films with greater or lesser twist of the polarization axis.

Through experimentation, the inventor has determined that through these such double-sided alignment actions, de-orientation of molecules on the volume of the film does not take place. On the contrary, it becomes possible to obtain a polarizing film with a higher degree of orientation. The turn of the optical axis through the thickness of the film occurs without disturbance of the order in the film structure. As a result, the degree of polarization of the obtained film is no less, and in some cases substantially greater than prior art films obtained through previously available methods, in which there is no variation of the polarization axis direction throughout the thickness of the film.

In the capacity of the molecularly oriented organic materials, which form liquid crystals, a wide range of organic materials may be used. As noted, the selected organic material or compound used to form the films according to the present invention should be capable of forming a thermotropic or lyotropic liquid-crystal phase. Additionally and/or alternatively, molecules of the organic compound or material are capable of forming supramolecular complexes such as are described in PCT International Patent Publication WO 94/28073.

To obtain an optically anisotropic film with a varying direction of the optical axis through the thickness of the film, a substrate with at least one anisotropic surface is used. The surface anisotropy of the substrate should be sufficient to provide the resultant alignment effect on the supramolecular complexes of the applicant LC (liquid crystal). An external alignment action sufficient to provide resultant orientation of the supramolecular complexes of the applicant LC is applied. The substrate alignment effect and that of the external alignment action are oriented in non-coincident directions. The degree and the character of each alignment action determine the law of variation of optical axis of the material throughout the thickness and over the surface of the film.

DESCRIPTION OF EXEMPLARY EMBODIMENTS

The present invention may be better understood in through the following description of individually envisioned embodiments thereof. Though these descriptive embodiments are intended to illustrative and demonstrate the various advantages and implementations of the present invention, they should in no way be construed to limit or otherwise restrict the limits and bounds of the invention.

In a first embodiment of the present invention (1), an optically anisotropic film of molecularly oriented organic material is provided. This film has varying throughout its thickness direction of optical axis (axes) on at least a fraction of the film's thickness, for at least one region of the spectrum and on at least a part of the area of the film.

In a second embodiment of the present invention (2), an optically anisotropic film according to embodiment 1 is provided. In embodiment 2, the film is an anisotropically absorbing, and/or phase-shifting film in at least one region of the spectrum.

In a third embodiment of the present invention (3), an optically anisotropic film according to either embodiment 1 or 2 is provided. In this embodiment, the first derivative of the function describing the variation of the angle of twist of the optical axis throughout the film's thickness is continuous in embodiment 3.

In a fourth embodiment of the present invention (4), an optically anisotropic film according to any of embodiments 1-3 is provided. In this embodiment, the function describing the variation of the angle of twist of the optical axis throughout the film's thickness is not symmetrical relative to the plane of any section of the film parallel to its surface.

In a fifth embodiment of the present invention (5), an optically anisotropic film according to any of embodiments 1-4 is provided. According to this embodiment, the film is obtained from a liquid crystal of at least one organic material, which forms a lyotropic or thermotropic liquid-crystal phase via application of the liquid crystal onto the substrate and utilizing an external alignment action. At least a part of the substrate surface possesses surface anisotropy, and the direction of the external alignment action does not coincide with the direction induced by at least a part of the substrate surface.

In a sixth embodiment of the present invention (6), an optically anisotropic film according to any of embodiments 1-5 is provided. According to this embodiment, the variation of the optical axis direction throughout the film's thickness is provided in the process of formation of the film via the effect on the LC of the anisotropic surface of the substrate and the external alignment action, while the directions of the mentioned alignment actions do not coincide.

In a seventh embodiment of the present invention (7), an optically anisotropic film according to any of embodiments 1-6 is provided. According to this embodiment, the law of variation of the polarization axis throughout the film's thickness is determined by the anisotropy of the substrate surface, and/or the direction and force of the external alignment action, and/or the thickness of the forming film, and/or the viscosity of the employed liquid crystal, and/or the conditions of its application and drying.

In an eighth embodiment of the present invention (8), an optically anisotropic film according to any of embodiments 1-7 is provided. According to this embodiment, at least one organic dye is used as the organic material for obtaining the liquid crystal. The organic dye has in its structural formula at least one ionogenic group that provides solubility in polar solvents in order to obtain the lyotropic liquid crystal phase, and/or at least one non-ionogenic group that provides solubility in polar or non-polar solvents in order to obtain the lyotropic liquid-crystal phase, and/or at least one anti-ion, which in the process of formation of the optically anisotropic film either remain in the structure of the molecule or not.

In a ninth embodiment of the present invention (9), an optically anisotropic film according to any of embodiments 1-8 is provided. According to this embodiment, at least one organic dye of the form:

$\{K\}(M)n$ is provided in the capacity of the organic dye. In the formula, K is the dye, the chemical formula of which contains at least one ionogenic groups (which may be the same group or different ionogenic groups). The one or more ionogenic groups provide solubility in polar solvents in order to form a lyotropic liquid-crystal phase. Also in the formula, M is an anti-ion and n—the number of anti-ions in a molecule of the dye, which could be a fraction in the case of sharing of one anti-ion by several molecules and in the case of n>1 one or more of multiple anti-ions could be different.

In a tenth embodiment of the present invention (10), an optically anisotropic film according to any of embodiments 1-9 is provided. In this embodiment, the film is formed by the multitude of supramolecular complexes of one or several organic materials, and the supramolecular complexes are oriented as to polarize passing light.

In an eleventh embodiment of the present invention (11), an optically anisotropic film according to any of embodiments 1-10 is provided. In this embodiment, the film comprises at least two fragments situated in one plane. The axes of polarization on the surface of the film (in the near-surface layer) are directed at an angle relative to each other ranging from approximately 0 to 90°.

In a twelfth embodiment of the present invention (12), an optically anisotropic film according to any of embodiments 1-11 is provided. In this embodiment, at least one second optically anisotropic film, and/or at least one phase-shifting film, and/or at least one birefringent film, and/or at least one alignment layer, and/or at least one protective film, and/or at least one film simultaneously serving as any combination of at least two of the above films is formed and/or applied on the surface of the optically anisotropic film.

In a thirteenth embodiment of the present invention (13), an optically anisotropic film according to any of embodiments 1-12 is provided. In this embodiment, the optically anisotropic film is a polarizing film, and/or a phase-shifting film, and/or a birefringent film, and/or an alignment layer, and/or a protective film, and/or a film simultaneously serving as any combination of at least two of the above films on at least a fraction of the film's thickness, and/or in at least one region of the spectrum, and/or on at least a part of the film's area.

In a fourteenth embodiment of the present invention (14), an optically anisotropic film according to any of embodiments 5-13 is provided. In this embodiment, the substrate is implemented with a polymer material or a glass, and has a surface that is flat, or convex, or concave, or varying according to a certain law. The anisotropic qualities of the substrate surface on at least a part of its surface are provided by either the chemical bonds, relief, or texture created on the substrate surface either with the material of the substrate itself or with the material applied onto the substrate surface.

In a fifteenth embodiment of the present invention (15), a method is provided for preparing an optically anisotropic film according to embodiment 1. In this embodiment, the film is formed via application of the liquid crystal of at least one organic material with removal of the solvent. In the process of film formation an external orienting action is imposed onto the liquid crystal and the film formed on the anisotropic surface of the substrate or alignment layer, while the direction of the external orienting action and the direction of the surface orientation of the substrate or layer are at an angle range from 0 to 90°.

In a sixteenth embodiment of the present invention (16), a method is provided for preparing an optically anisotropic film according to embodiment 15. In this embodiment, the surface of the substrate and/or alignment layer comprises at least two regions with different direction of surface orientation.

In a seventeenth embodiment of the present invention (17), a method is provided for preparing an optically anisotropic film according to any of embodiments 16-17. In this embodiment, in order to obtain surface anisotropy, a regular texture or a relief is formed on the surface of the substrate with either the material of the substrate itself or the applied onto the substrate material via mechanical and/or chemical and/or ionic processing.

In an eighteenth embodiment of the present invention (18), a method is provided for preparing an optically anisotropic film according to any of embodiments 15-17. In this embodiment, in order to provide additional variation of the direction of the polarization axis throughout the film's thickness, the direction of the orienting action over the surface of the film is changed during formation process.

In a nineteenth embodiment of the present invention (19), a method is provided for preparing an optically anisotropic film according to any of embodiments 15-18. In this embodiment regions with different properties are formed on the surface of the substrate, including ones with different direction of surface orientation.

EXPERIMENTAL

A number of experiments were conducted according to the method and system of the present invention. These experiments are intended for illustration purposes only, and are not intended to limit the scope of the present invention in any way.

In one experimental example, a layer of polyimide with the thickness of 50-100 mn is applied onto a glass plate via a known method. The polyimide layer is rubbed with a cloth at an angle of 45° to the edge of the lamina. A water solution (8% wt. $H_2O$) of the liquid crystal of sulfonated indanthrone is applied on its surface by a known method (with the external alignment action on the liquid crystal). In solution, the molecules are grouped in stacks, comprising the supramolecular complexes. During application of the LC solution the orientation of the complexes via taking place in the direction of the action.

The thickness before the operation of drying is 5-10 μm. The sample is dried in air at room temperature. Additional orientation of supramolecular complexes takes place during drying.

After drying, the molecules in the near-surface layer are oriented so that their plane is directed perpendicularly to the direction of surface orientation, but in the upper layers— perpendicularly to the direction of film application.

Measurement of transmittance by the obtained sample is conducted with spectrophotometer in polarized light with wavelength of 640 nm. The plane of light polarization is oriented perpendicularly to the direction of film application. Measurement of transmittance is taken sequentially with two sample positions. At first the sample is oriented with the film toward the source of polarized light, then, the substrate toward the source. Depending on the thickness of the film, transmittance in the first case lays in the range from 0.5 to 5%, in the second—from 20 to 40%.

Polarizers obtained by the above-described method according to the invention, were characterized by the presence of anisotropically absorbing film with varying direction of polarization axis through thickness of the film. The method of obtaining of such film is simple the obtained film is continuous without breaks. It is possible to choose the optimum thickness of the film. The thickness of the polarizer is minimum. Moreover, polarizing effectiveness of the obtained polarizers is no less of the known competitors, which make use of analogous organic dyes. The given film may be used where it is necessary to achieve the mentioned quality, which constituted by the varying direction of the polarization axis through thickness of the film.

The possibility of obtaining optically anisotropic films with varying direction of the optical axis through thickness of the film, while simplifying the method of their manufacturing and providing reproducible optical parameters will substantially broaden the area of application of such films in science and technology.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An optically anisotropic film comprising:
    a substrate and a molecularly oriented organic material formed on the substrate,
    wherein said substrate has at least a part having a surface anisotropy,
    wherein said organic material is formed of a lyotropic liquid-crystal comprising at least one organic dye, said organic dye having a structural formula comprising at least one ionogenic group, said at least one ionogenic group providing solubility in polar solvents, and said lyotropic liquid-crystal is aligned to a direction which does not coincide with a direction defined by said surface anisotropy and
    wherein at least one optical axis of said film varies throughout the thickness direction of said film on at least a fraction of the thickness of said film and on at least a part of the surface of said film.

2. The optically anisotropic film according to claim 1, wherein said film is an anisotropically absorbing film in at least one spectral range.

3. he optically anisotropic film according to claim 1 or 2, wherein said film is a phase-shifting film in at least one spectral range.

4. The optically anisotropic film according to claim 1, wherein the first derivative of the function describing the variation of the direction of the optical axis throughout the film's thickness is continuous.

5. The optically anisotropic film according to claim 1, wherein the function describing the variation of the direction of the optical axis throughout the film's thickness is not symmetrical relative to the plane parallel to any section of the film surface.

6. The optically anisotropic film according to claim 1, wherein said organic dye further comprises at least one non-ionogenic group that increases the solubility of said organic dye in polar and/or non-polar solvents in order to obtain the lyotropic liquid-crystal phase.

7. The optically anisotropic film according to claim 1, wherein at least one of said organic dyes has the formula:

wherein K is the organic dye, the chemical formula of which contains an ionogenic group or several same or different ionogenic groups, M is an anti-ion, and n is the number of anti-ions in a molecule of the dye, and wherein n is a fraction in the case of sharing of one anti-ion by several molecules, and anti-ions could be different in case n>1.

8. The optically anisotropic film according to claim 2, wherein the film is formed by a quantity of supramolecular complexes of at least one organic material, and the supramolecular complexes are oriented so as to polarize light passing through said film.

9. The optically anisotropic film according to claim 2, wherein said film consists of at least two fragments situated in one plane, and the axes of polarization on the surface or in the near-surface layer of said film are directed at an angle relative to each other, and wherein said angle is in the range of approximately 0 to 90°.

10. The optically anisotropic film according to claim 1, further comprising at least a second film formed on the surface of said optically anisotropic film, wherein said second film is selected from the group consisting of an optically isotropic film, a phase-shifting film, a birefringent film, an alignment layer, a protective film, and a film simultaneously serving as any combination of at least two of the above films.

11. The optically anisotropic film according to claim 1, wherein said film has a property of at least one film or layer selected from the group of polarizing film, phase-shifting film, birefringent film, alignment layer, protective film, and a film simultaneously serving as any combination of at least two of the films of the said group on at least a part of the area of said film.

12. The optically anisotropic film according to claim 1, wherein said substrate is made of a polymer material or a glass.

13. The optically anisotropic film according to claim 1, wherein said substrate has flat, or convex, or concave surface or a surface varying according to a certain law.

14. The optically anisotropic film according to claim 1, wherein at least part of a surface of said substrate has a relief or texture.

15. A method of making the optically anisotropic film of claim 1, comprising:
    applying a lyotropic liquid crystal on a surface of a substrate, said lyotropic liquid crystal comprising at least one organic material dissolved in a solvent, at least a part of said substrate having a surface anisotropy;
    applying an external alignment action to said lyotropic liquid crystal, said external alignment action having a direction which does not coincide with a direction defined by said surface anisotropy; and
    removing said solvent.

16. The method of claim 15, wherein said surface of said substrate has at least two regions with different directions of surface orientation.

17. The method of claim 15, wherein said surface anisotropy is formed by a texture on said surface of said substrate with either the material of said substrate or one or more materials applied onto said substrate.

18. The method of claim 17, wherein said texture is formed via a process selected from the group consisting of mechanical, chemical, and ionic processing.

19. The method of claim 15, wherein the direction of the external alignment action over said surface of the film varies during the film manufacturing process.

20. The method of claim 15, wherein one or more regions having different properties are formed on said surface of said substrate.

21. The method of claim 20, wherein said one or more regions are formed with differing directions of the surface orientation.

* * * * *